(12) United States Patent  
Ikeda et al.

(10) Patent No.: US 7,418,812 B2
(45) Date of Patent: Sep. 2, 2008

(54) CABLE OR THE LIKE PROTECTION AND GUIDE DEVICE

(75) Inventors: Masaaki Ikeda, Osaka (JP); Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/828,537

(22) Filed: Jul. 26, 2007

(65) Prior Publication Data

US 2008/0053057 A1    Mar. 6, 2008

(30) Foreign Application Priority Data

Sep. 4, 2006    (JP)    .............................. 2006-239029

(51) Int. Cl.
*F16G 13/00*    (2006.01)

(52) U.S. Cl. .............................. 59/78.1; 248/49; 248/51

(58) Field of Classification Search .................. 59/78.1, 59/900; 248/49, 51
See application file for complete search history.

(56) References Cited

U.S. PATENT DOCUMENTS

| 3,473,769 | A | * | 10/1969 | James | ......................... | 59/78.1 |
| 5,411,443 | A | * | 5/1995 | Meier et al. | ................. | 474/145 |
| 6,161,373 | A | | 12/2000 | Heidrich et al. | | |
| 6,459,037 | B2 | * | 10/2002 | Muller et al. | ................. | 59/78.1 |
| 6,708,480 | B1 | * | 3/2004 | Wehler | ........................ | 59/78.1 |
| 2001/0025715 | A1 | | 10/2001 | Muller | | |

FOREIGN PATENT DOCUMENTS

| JP | 10-028310 | 1/1998 |
| JP | 10-047441 | 2/1998 |
| JP | 2001-514725 | 9/2001 |
| WO | PCT/EP 98/01214 | 6/1998 |

OTHER PUBLICATIONS

U.S. Appl. No. 11/781,113, Komiya.
U.S. Appl. No. 11/748,243, Komiya.
U.S. Appl. No. 12/024,805, Ikeda.

* cited by examiner

*Primary Examiner*—David B Jones
(74) *Attorney, Agent, or Firm*—Woodling, Krost and Rust

(57) ABSTRACT

The present invention provides a cable or the like protection and guide device which accommodates a cable or the like while allowing for examination of the cable. Smooth linear and flexional movement is achieved while not compromising the form stability of the cable accommodation space. Partial or local wear is suppressed. The device is made of a synthetic resin and accommodates a cable in a rectangular cable accommodating space. The accommodating space is surrounded by the outer circumferential wall portion, which is openable, a pair of side wall portions, and an inner circumferential wall portion. Inserting protrusion mechanisms, engagement mechanisms, slits, opening windows and flexion restricting piece portions contribute to the stability and usefulness of the device.

11 Claims, 4 Drawing Sheets

CABLE OR THE LIKE PROTECTION AND GUIDE DEVICE

This patent application includes a claim of foreign priority to prior filed Japanese Patent Application 2006-239029 filed on Sep. 4, 2006.

TECHNICAL FIELD

The present invention relates to a cable or the like protection and guide device which accommodates a cable(s), hose(s), or the like, used for supplying electric power, energy, or compressed air. Such device guides and protects cables or the like in both dynamic and static positions. Such device safely and reliably protects the guided cable(s), hose(s), or the like used in semiconductor production apparatus, pharmacy development testing apparatus, vehicle door opening/closing apparatus, vehicle slide seat apparatus, or vehicle electric sunroof apparatus or the like.

BACKGROUND TECHNOLOGY

Some conventional cable or the like protection and guide devices (as provided for in Japanese Laid-Open Patent Publication No. Hei. 10-28310) have at least one row of protruded pieces integrally molded to the bottom wall of an accommodating body (which accommodates a cable or the like). These same cable or the like protection and guide devices have split protruded pieces, abutted on each other at a flexed portion of the accommodating body, to maintain a fixed flexed position. An openable lid piece is integrally molded on an upper portion of one side wall piece of an accommodating body so that the lid piece is detachably provided on the other side wall piece.

Also, conventional cable or the like protection and guide devices might include a line guide device (as in Japanese Patent Publication No. 2002-524011) which has a line accommodating passage having a cover range and a side wall range.

PROBLEMS TO BE SOLVED BY THE INVENTION

When torsion due to external force is applied to the cable or the like moving guide device described in Japanese Laid-Open Patent Publication No. Hei. 10-28310, a side wall piece and a lid piece are likely to shift. As a result a contact problem occurs in the moving guide. Without a deformation prevention mechanism to react with such torsion, the moving guide of the cable or the like is affected despite wall thickness and rigidity of the material.

Further, line accommodating passages, as described in Japanese Patent Publication No. 2002-524011, cannot be opened or closed in a line guide device, thus preventing the ability of one to examine the cable.

The present invention provides a cable or the like protection and guide device which accommodates cables or the like and allows for easy checking of a cable or the like. Strong torsional rigidity provides for excellent operability of the cable or the like protection and guide device. The strong torsional rigidity ensures an operable accommodation space as well as smooth linear and flexional movement. Since lateral shifting is suppressed, partial or local wear is reduced so that the cable or the like protection and guide device lasts for a long period of time.

SUMMARY OF THE INVENTION

MEANS FOR SOLVING THE PROBLEMS

The present cable or the like protection and guide device is made of a synthetic resin. The rectangular tubular cable accommodating space is surrounded by an integrally formed part which includes a pair of right and left side wall portions, an inner circumferential wall portion, and an outer circumferential wall. The rectangular tubular cable accommodating space accommodates a cable. The right side wall portion is sometimes referred to herein as the one side wall portion and the left side wall portion is sometimes referred to herein as another or other side wall portion. The inner circumferential wall portion connects the pair of right and left side wall portions to each other. The pair of right and left side walls connects the outer circumferential wall portion. The outer circumferential wall is openable. The outer circumferential wall portion is integrally formed on a flexing outer circumferential side of one of the side wall portions. The outer circumferential wall portion detachably engages with a flexing outer circumferential side of the other side wall portions.

Both side wall portions include flexion restricting piece portions which restrict flexion movement of the device. The one side wall portion includes an integrally formed outer circumferential wall portion hinged thereto such that the outer circumferential wall portion is openable. The outer circumferential wall portion includes an inserting protrusion which releasably interengages an inserting hole in the other side wall portion. The inserting protrusion engages the inserting hole and together they form the inserting protrusion mechanism.

The outer circumferential wall portions include a slit therein as does the right (one) and left (other) side wall portions. The slits are easily made by a punching process after extrusion of the tube material.

Additionally, the left and right side wall portions include an opening window. The outer circumferential wall portion includes a concave engagement mechanism portions and a convex engagement mechanism portion. The slits, window openings, concave and convex engagement mechanism portions, and the flexion restricting piece portion promote the stability of the device.

The flexion restricting piece portion is made by punching at a predetermined flexion pitch angle(s) on both sides of each of the slit locations after extrusion of the tube material. The flexion restricting piece is formed on the portion of both side wall portions nearest the inner circumferential wall portion.

The inserting protrusion mechanism detachably engages between the outer circumferential wall portion, (which is integrally formed from the one side wall portion), and the other side wall portion. The outer circumferential wall portion includes an inserting protrusion which releasably interengages an inserting hole in the other side wall portion. The inserting protrusion engages the inserting hole and together they form the inserting protrusion mechanism.

The inserting protrusion mechanism is made at a predetermined length by punching after extrusion of the tube material.

The concave and convex engagement mechanism portions are on the outer circumferential wall portion. The concave and convex engagement mechanism portions are easily made by punching after extrusion of the tube material.

The opening windows penetrate into the cable accommodating space and are on both the side wall portions. The opening windows are made at a predetermined size and shape by punching after extrusion of the tube material.

The device is made of a synthetic resin such as polypropylene.

EFFECTS OF THE INVENTION

The present cable or the like protection and guide device is made of a synthetic resin. The rectangular tubular cable accommodating space is surrounded by an integrally formed part which includes a pair of right and left side wall portions, an inner circumferential wall portion, and an outer circumferential wall. The rectangular tubular cable accommodating space accommodates a cable. The right side wall portion is sometimes referred to herein as the one side wall portion and the left side wall portion is sometimes referred to herein as the other side wall portion or another side wall portion. The inner circumferential wall portion connects the pair of right and left side wall portions to each other. The outer circumferential wall portion connects the pair of right and left side walls. The outer circumferential wall is openable. The outer circumferential wall portion is integrally formed on a flexing outer circumferential side of the one side wall portion. The outer circumferential wall portion detachably engages with a flexing outer circumferential side of the other side wall portion.

The cable or the like protection and guide device accommodates, guides, and protects cable(s), hose(s) or the like in the rectangular tubular cable accommodating space in both dynamic and static positions. The openable outer circumferential wall portion allows for easy examination of the cable(s) or hose(s) or the like contained within the cable accommodating space. The device, made of polypropylene, provides for easy flexing. The flexion restricting piece(s) restrict the flexing of the device to certain predetermined flexional angles. The overall structure of the device allows for easy use and excellent operability of cable(s), hose(s), or the like within the cable protection and guide device.

As the cable or the like protection and guide device is extruded, both the right and left side wall portions, the inner circumferential wall portion and the outer circumferential wall portion are integrally formed as a single part. The effect of the integrally formed single part which creates the cable accommodating space is that there are fewer parts involved and assembly requirements are minimized, regardless of the lengths of cable(s) or hose(s) involved. A cable protection and guide device can be easily made of a desired length because the extrusion process creates one integrally formed part. The extrusion process allows cutting of the extruded part to the desired length. As a result, a reduced work load can be attained for the manufacturing and assembly of the device.

The slits included in the outer circumferential wall portions and in the right (one) and left (other) side wall portions provide for smooth, linear, and flexional movement. The slits separate the outer circumferential portion and the pair of right and left side wall portions. The slits are formed at a predetermined flexing pitch in the longitudinal direction. The slits S are easily made by a punching process after extrusion of the tube material.

A concave engagement mechanism portion engages a convex engagement mechanism portion of the next adjacent link to form an engagement mechanism. Engagement mechanism(s) restrict lateral shifts in the cable protection and guide device. The engagement mechanisms ensure stability of the cable accommodating space during linear and flexional movement. The engagement mechanisms also offer strong torsional rigidity which results in dimensional stability of the cable accommodating space. Additionally, partial wear and local wear due to the lateral shift are suppressed improving the longevity and endurance of the device. The concave and convex engagement mechanisms are easily created by punching the extrusion.

During flexional movement, flexion restricting piece portion(s) abut adjacent flexion restricting piece portion(s) resulting in the restriction of flexion movement according to the fixed flexional angle in the longitudinal direction of the tube. The flexion restricting piece portion prohibits excessive flexion movement while both ensuring smooth movement of the device and ensuring dimensional stability of the cable accommodating space.

The inserting protrusion mechanism, along with the openable outer circumferential wall portion, minimizes assembly and disassembly in opening a cable protection and guide device. The form of the inserting protrusion mechanism can vary depending on need and use. Strain in a pair of right and left inner circumferential wall portions is suppressed. Additionally, the inserting protrusion mechanism ensures dimensional stability during linear and flexional movement.

The opening windows absorb strain deformation of the cable accommodating space generated by internal movement of a cable during linear or flexional movement. The opening windows ensure shape retention of the cable accommodating space. Additionally, the opening windows contribute to a lighter device, while also allowing for examination of the cable(s), hose(s) or like within the cable accommodating space.

Synthetic resins such as polypropylene can be easily extruded and formed by punching. Synthetic resins such as polypropylene are also sufficiently rigid to ensure stability of the cable accommodating space.

DESCRIPTION OF THE INVENTION

Figure 1:
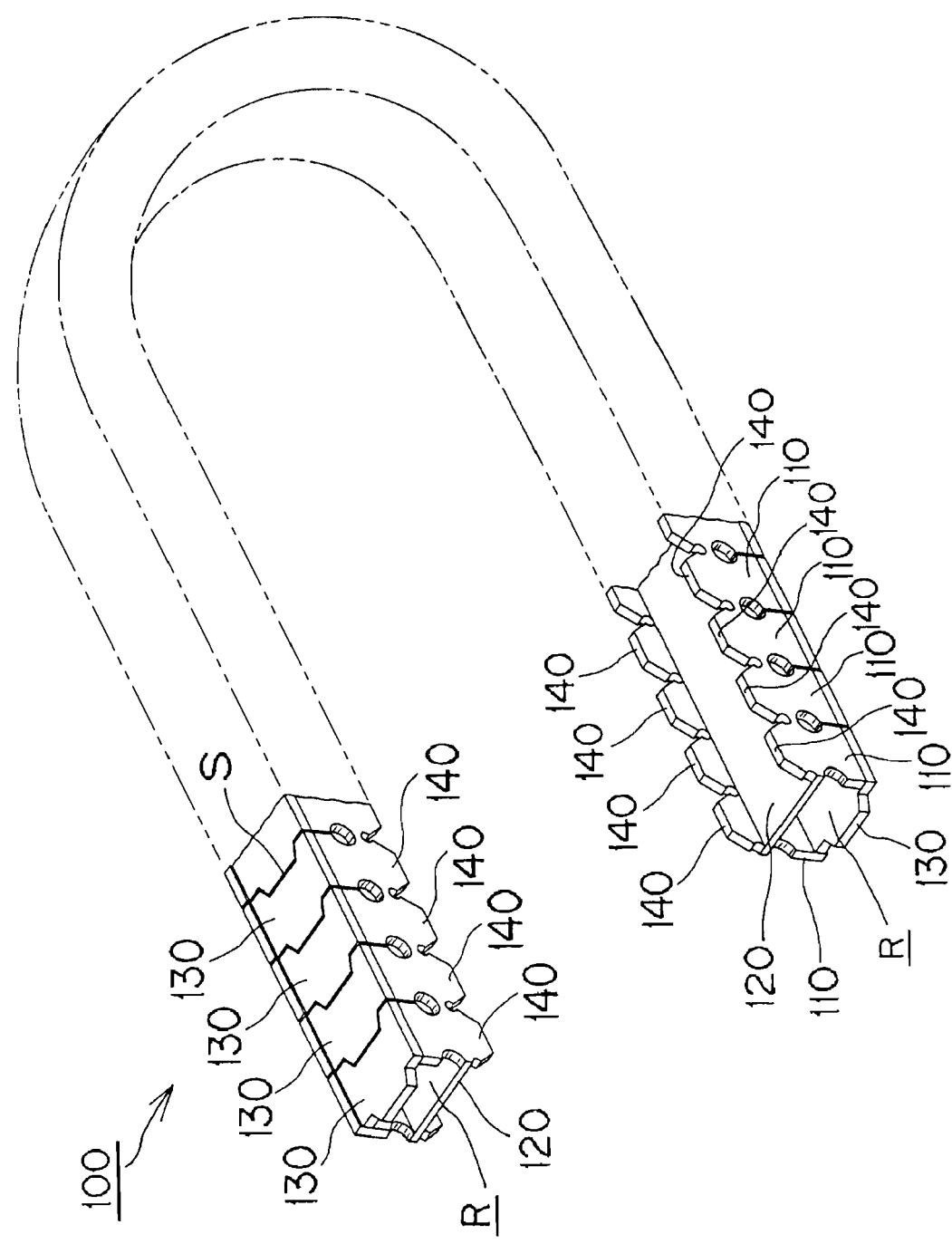
FIG. 1 is a whole view of the cable or the like protection and guide device, which is an example of the present invention.

The invention includes slits in the outer circumferential wall portions and the side walls. The outer circumferential wall portions include a slit therein as does the right (one) and left (other) side wall portions. The flexion restricting piece portion is made by punching predetermined flexion pitch angle(s) on both sides of each of the slit locations after extrusion of the tube material. The slits are easily made by a punching process after extrusion of the tube material.

The concave and convex engagement mechanism portions are positioned respectively in front and rear positions on the outer circumferential wall portion. The concave and convex engagement mechanism portions are easily made by punching after extrusion of the tube material.

The concave and convex engagement mechanisms portions engage each other to form an engagement mechanism. The engagement mechanism(s) restrict lateral shifts in the cable protection and guide device. The engagement mechanism(s) ensure stability of the cable accommodating space during linear and flexional movement. The engagement mechanism(s) provide strong torsional rigidity which results in dimensional stability of the cable accommodating space. Additionally, partial wear and local wear due to the lateral shift are suppressed improving the longevity and endurance of the device. Dimensional stability of the cable accommodating space is improved resulting in smooth and excellent operability of the device. Further, examination of the cable is easy.

Synthetic resins such as polypropylene, polyethylene, polyester or the like, resist flexional strain which is generated during flexional operation of a cable protection and guide device. Use of synthetic resins results in excellent dimensional stability of the cable accommodating device. Further, molding of synthetic resins is easy. The preferred material is polypropylene because it is easily molded and formed by punching while providing dimensional stability of the cable accommodating space.

A concave engagement mechanism portion and convex engagement mechanism portion together form an engagement mechanism. Engagement mechanism(s) restrict lateral shifts of the outer circumferential wall portion. The concave and convex portions of the engagement mechanism are located in front and rear positions of the outer circumferential wall and are separated by a slit such that snaking movement can be avoided during linear movement. For example, a convex engagement mechanism portion may be formed in a triangular tongue piece-shape and the corresponding concave engagement mechanism portion may be formed in a V-shape. The convex engagement mechanism portion and the concave engagement mechanism portion engage each other. The convex engagement mechanism portion may also be shaped as a trapezoidal tongue to engage a concave engagement mechanism portion of the reversed trapezoidal shape. The concave and convex engagement mechanism portions may have many shapes but ultimately engage each other to prevent lateral shifts as engagement mechanisms.

The inserting protrusion mechanism detachably engages between the outer circumferential wall portion (which is integrally formed from one of the side wall portions) and the other side wall portion. The inserting protrusion mechanism is made at a predetermined length by punching after extrusion of the tube material. The inserting protrusion mechanism's shape, arrangement gap, and the like can be appropriately selected.

EXAMPLE

A cable or the like protection and guide device 100, which is an example of the present invention, will be described with reference to FIGS. 1 to 4.

Figure 2:
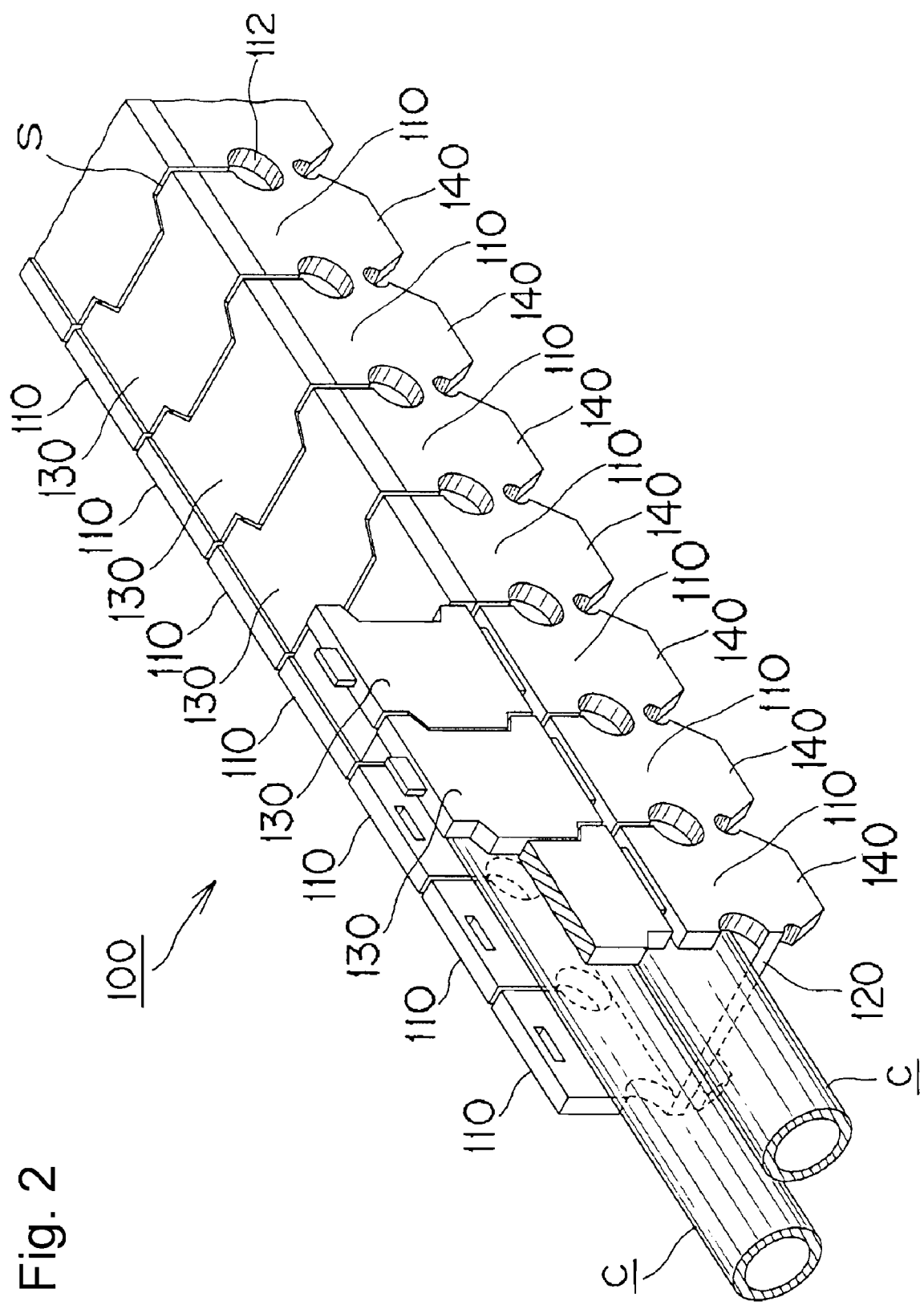
FIG. 2 is a perspective view showing an enlarged linear state of FIG. 1.
Figure 3:
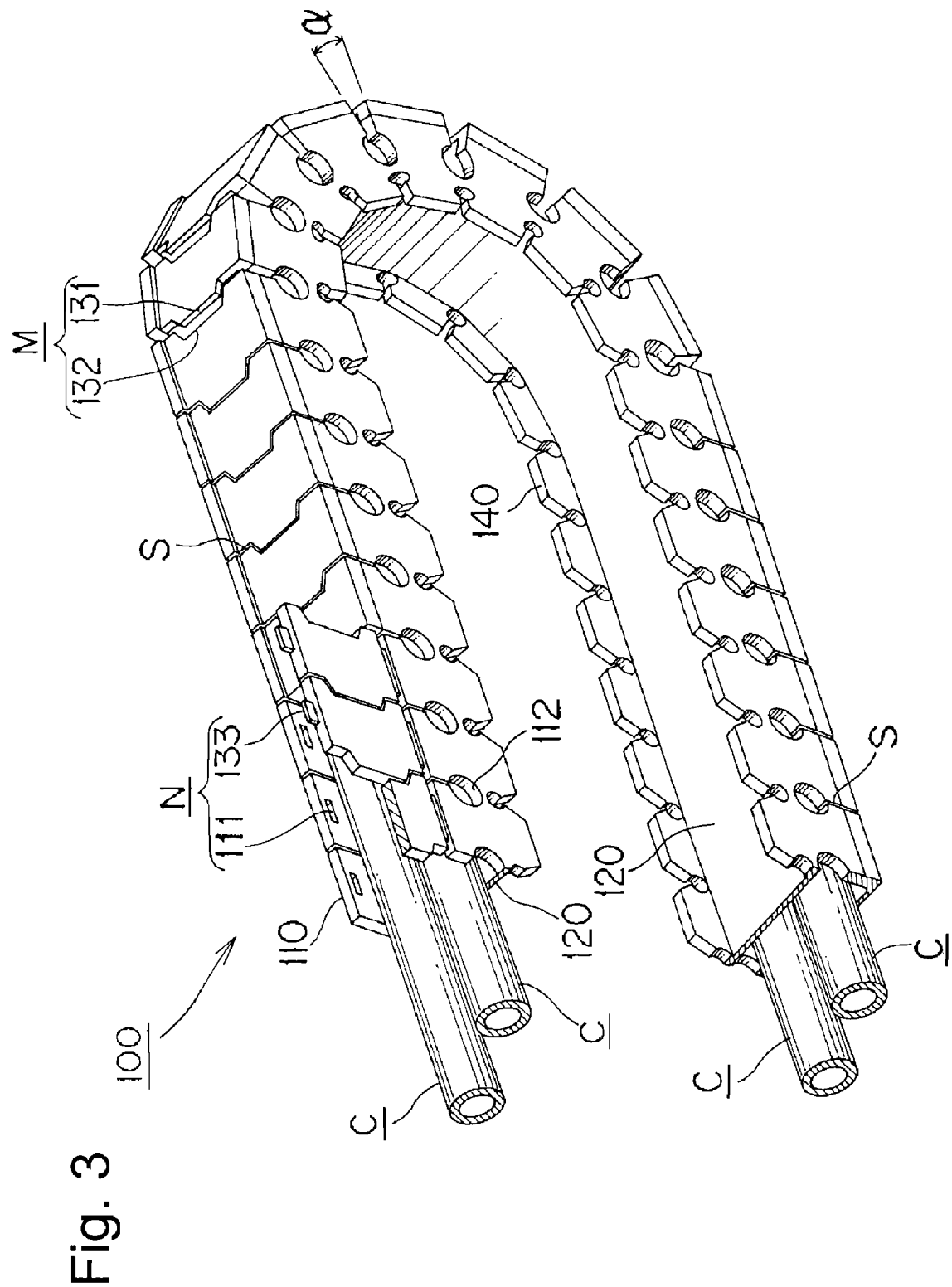
FIG. 3 is a perspective view showing an enlarged flexional state of FIG. 1.
Figure 4:
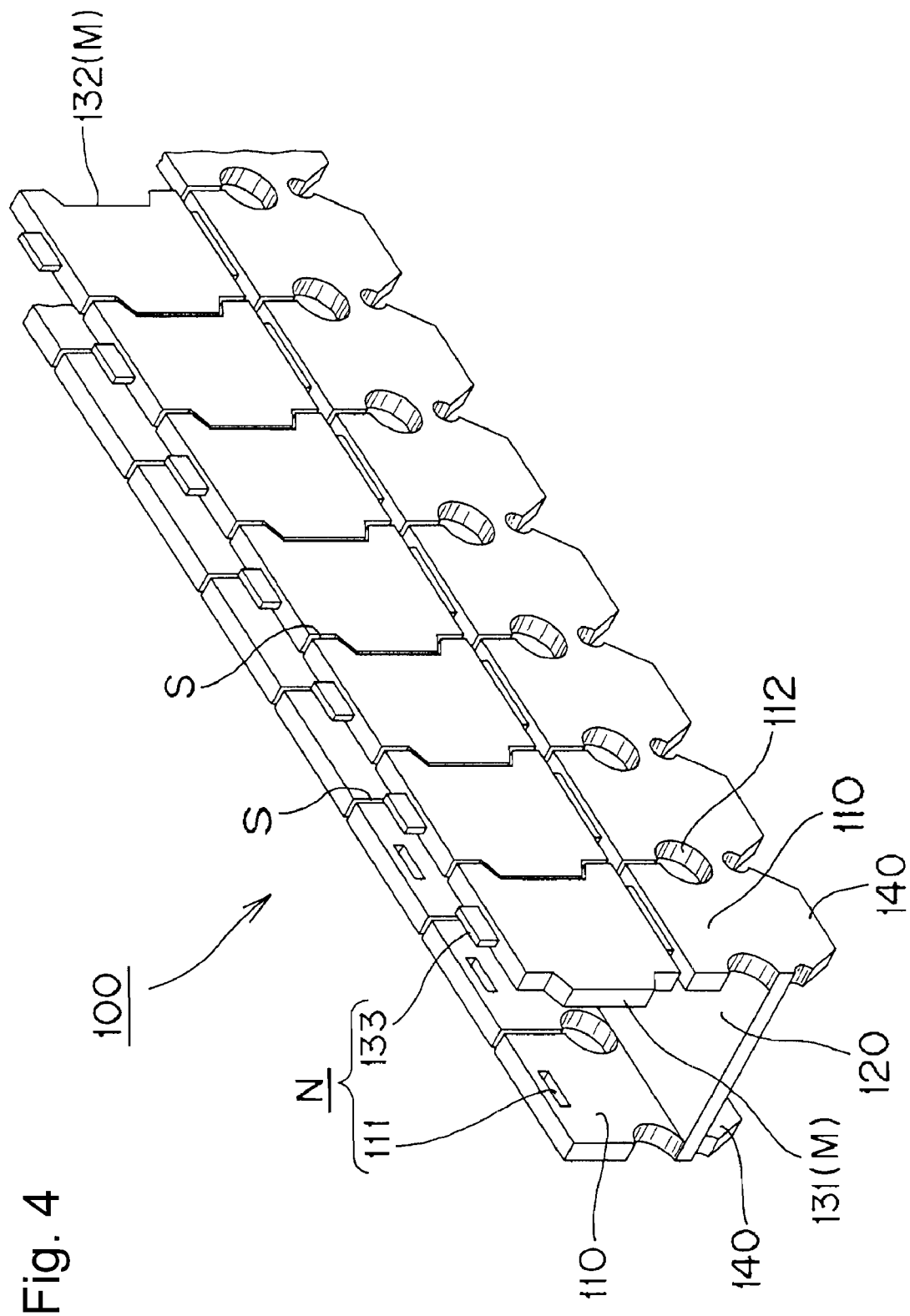
FIG. 4 is a perspective view of a state where an openable outer circumferential wall portion is opened.

FIG. 1 is a whole view of the cable or the like protection and guide device, which is an example of the present invention. FIG. 2 is a perspective view showing an enlarged linear state of FIG. 1. FIG. 3 is a perspective view showing an enlarged flexional state of FIG. 1. FIG. 4 is a perspective view of a state where an outer circumferential wall portion is open.

The cable or the like protection and guide device 100, which is an example of the present invention, is used for protecting and guiding cables or the like C such as electric cables. The cables or the like connect a movable portion and a stationary portion (not shown) of semiconductor devices, pharmacy development testing devices, vehicle door opening/closing devices, vehicle slide seat devices, or vehicle electric sunroof devices. The cables or the like transmit and supply electric signals, pressurized liquid, and/or pressurized gas. The device 100 exhibits a linear position or a flexed position in accordance with the movable portion and the stationary portion of the device.

As shown in FIGS. 1 to 3, the cable or the like protection and guide device 100 is formed by extruding and punching polypropylene to form the rectangular tubular cable accommodating space R. The rectangular tubular cable accommodating space R is surrounded by an integrally formed part which consists of a pair of right and left side wall portions 110, 110, an inner circumferential wall portion 120, which connects said pair of right and left side wall portions 110, 110 to each other and an outer circumferential wall portion 130. The one side wall portion 110 includes an integrally formed outer circumferential wall portion 130 hinged thereto such that the outer circumferential wall portion 130 is openable. The outer circumferential wall portion 130 includes an inserting protrusion 133 which releasably interengages an inserting hole 111 in the other side wall portion 110. The inserting protrusion 133, together with the inserting hole 111 forms an inserting protrusion mechanism N.

The cable or the like protection and guide device 100 of the present invention is cut in the desired length corresponding to the cable or the like C to be accommodated. The one side wall portion 110, the other side wall portion 110, the inner circumferential wall portion 120, and the outer circumferential wall portion 130 form an integrally formed part. The integrally formed part is formed by extrusion.

Polypropylene is the material of the cable or the like protection and guide device 100 of the present invention. Polypropylene is easy to extrude and punch during production and sufficiently exhibits dimensional stability of the cable accommodating space R.

Both side wall portions 110, 110 of the cable or the like protection and guide device 100, as shown in FIG. 3, include flexion restricting piece portion(s) 140, which restrict flexion movement of the device to a fixed flexion angle α. The flexion restricting piece portion 140 is made by punching predetermined flexion pitch angle(s) on both sides of each of the side walls 110, 110 after extrusion of the tube material. Further the flexion restricting piece 140 is formed on the portion of both side wall portions nearest the inner circumferential wall portion 120.

During flexional movement, flexion restricting piece portion(s) 140 abut adjacent flexion restricting piece portion(s) 140 resulting in the restriction of flexion movement to the fixed flexion angle(s) α. The flexion restricting piece portion(s) 140 prohibit excessive flexion movement while both ensuring smooth movement of the device and ensuring form stability of the cable accommodating space R.

Slits S included on the outer circumferential wall portion 130 and on the right (one) 110 and left (other) 110 side wall portions provide for space therebetween so that smooth, linear, and flexional movement can be achieved. The slits S are easily made by a punching process after extrusion of the tube material.

The convex engagement mechanism portions 131 and the reverse concave engagement mechanism portions 132 are positioned in either front or rear positions on the outer circumferential wall portion 130. The convex engagement mechanism portions 131 and the concave engagement mechanism portions 132 are easily made by punching after extrusion of the tube material.

A concave engagement mechanism portion 132 engages a convex engagement mechanism portion 131 to form an engagement mechanism M. Engagement mechanism(s) M restrict lateral shifts in the cable protection and guide device. The engagement mechanisms M ensure stability of the cable accommodating space R during linear and flexional movement. The engagement mechanisms M also offer strong torsional rigidity which results in form stability of the cable accommodating space R. Additionally, partial wear and local wear due to lateral shift are suppressed improving the longevity and endurance of the device.

As shown in FIGS. 1 to 4, the convex engagement mechanism portion 131 is shaped as a trapezoidal tongue set to engage a concave engagement mechanism portion 132 of the reversed trapezoidal shape.

The inserting protrusion mechanism N detachably engages between the outer circumferential wall portion 130 (which is integrally formed from one of the side wall portions 110) and the other side wall portion 110. The inserting protrusion mechanism N is made at a predetermined length by punching after extrusion of the tube material. The inserting protrusion mechanism's shape, arrangement gap, and the like can be appropriately selected.

The outer circumferential wall portion 130 includes an inserting protrusion 133 which releasably interengages an inserting hole 111 in the other side wall portion 110. The inserting protrusion 133 engages the inserting hole 111 and together they form the inserting protrusion mechanism N. The inserting protrusion mechanism allows for the cable accommodating space R to be openable. Further, the inserting protrusion mechanism N ensures form stability of the cable accommodating space R during linear and flexional movement.

An opening window 112 penetrates into the cable accommodating space R and is on both sides of the slit S in the one side wall portion or the other side wall portion 110, 110. The opening window 112 is made at a predetermined size and shape by punching after extrusion of the tube material.

The opening windows 112 absorb strain deformation of the cable accommodating space which is generated by internal movement of a cable during linear or flexional movement. The opening windows 112 ensure shape retention of the cable accommodating space R. Additionally, the opening windows 112 contribute to a lighter device while also allowing for examination of the cable(s), hose(s) or like C within the cable accommodating space R.

The outer circumferential wall portion 130 of the present example of the cable or the like protection and guide device 100 includes a slit S therein as does the right (one) and left (other) side wall portions 110, 110. The slits S included on the outer circumferential wall portion 130 and on the right (one) 110 and left (other) 110 side wall portions provide for space, so that smooth, linear, and flexional movement can be achieved. The slits are formed at a predetermined flexing pitch. The slits S are easily formed by a punching process after extrusion of the tube material.

The convex engagement mechanism portions 131 and the reverse concave engagement mechanism portions 132 are positioned respectively in either front or rear positions on the outer circumferential wall portion 130. The convex engagement mechanism portions 131 and the concave engagement mechanism portions 132 are easily made by punching after extrusion of the tube material.

A concave engagement mechanism portion 132 engages a convex engagement mechanism portion 131 to form an engagement mechanism M. Engagement mechanism(s) M restrict lateral shifts in the cable protection and guide device. The engagement mechanisms M ensure stability of the cable accommodating space R during linear and flexional movement. The engagement mechanisms M also offer strong torsional rigidity which results in form stability of the cable accommodating space R. Additionally, partial wear and local wear due to the lateral shift are suppressed improving the longevity and endurance of the device. Engagement mechanism(s) M allow for better accommodation of cable C, for examination of cable C, and for the smooth and excellent operation of the device.

The inserting protrusion mechanism N detachably engages between the outer circumferential wall portion 130, which is integrally formed from one of the side wall portions 110, and the other side wall portion 110. The inserting protrusion mechanism N is made at a predetermined length by punching after extrusion of the tube material. The inserting protrusion mechanism's shape, arrangement gap, and the like can be appropriately selected.

The outer circumferential wall portion 130 includes an inserting protrusion 133 which releasably interengages an inserting hole 111 in the other side wall portion 110. The inserting protrusion 133 engages the inserting hole 111 and together they form the inserting protrusion mechanism N. The inserting protrusion mechanism allows for the Cable accommodating space R to be openable. Further, the inserting protrusion mechanism N ensures form stability of the cable accommodating space R during linear and flexional movement.

DESCRIPTION OF REFERENCE NUMERALS

100 . . . Cable or the like protection and guide device
110 . . . Side wall portion
111 . . . Inserting hole
112 . . . Opening window
120 . . . Inner circumferential wall portion
130 . . . Outer circumferential wall portion (openable)
131 . . . Convex engagement mechanism portion (trapezoidal)
132 . . . Concave engagement mechanism portion (reversed trapezoidal)
133 . . . Inserting protrusion
140 . . . Flexion restricting piece portion
C . . . Cable (Cables) or the like
R . . . Cable accommodating space
$\alpha$ . . . Flexional angle
S . . . Slit
M . . . Concave and convex engagement mechanism
N . . . Inserting protrusion mechanism The invention has been described by way of examples only and those skilled in the art will readily recognize that certain changes and modifications may be made to the examples without departing from the spirit and scope of the appended claims.

The invention claimed is:

1. A cable protection and guide device, comprising:
an integral extrusion made of a synthetic resin;
said integral extrusion includes a plurality of right side wall portions, a plurality of left side wall portions, an inner circumferential wall, and a plurality of outer circumferential wall portions which form a cable accommodating space;
said inner circumferential wall connects said right side wall portions and said left side wall portions;
said right and left side wall portions are articulately and integrally connected to each other in a longitudinal direction enabling said right and left side wall portions to form a flexional circumferential bend having a flexional inner circumferential side and a flexional outer circumferential side;
each of said side wall portions includes a flexional inner circumferential side residing during bending on said flexional inner circumferential side of said bend;

each of said side wall portions includes a flexional outer circumferential side residing during bending on said flexional outer circumferential side of said bend;

said outer circumferential wall portions are integrally formed on said flexional outer circumferential side of said right side wall portions;

said outer circumferential wall portions are openable;

said outer circumferential wall portions detachably engage said left side wall portions;

said integral extrusion includes a plurality of slits;

said plurality of slits are in said outer circumferential wall portions, said right side wall portions, and said left side wall portions;

said plurality of slits in said outer circumferential wall portions separate said outer circumferential wall portions;

said plurality of slits in said right side wall portions separate said right side wall portions;

said plurality of slits in said left side wall portions separate said left side wall portions;

said right side wall portions and said left side wall portions each include a flexion restricting portion on said inner circumferential sides thereof;

said plurality of slits in said right side wall portions and said plurality of slits in said left side wall portions form a flexion angle;

said flexion restricting portion of each of said right sidewall portions and said flexion restricting portion of each of said left side wall portions restricts said flexion angle during bending;

said plurality of slits in said outer circumferential wall portions form a concave engagement mechanism portion and a convex engagement mechanism portion; and, said concave engagement mechanism portions and said convex engagement mechanism portions of said outer circumferential wall portions prohibiting lateral shifting of said device.

2. A cable protection and guide device according to claim 1, wherein said flexion restricting portions further comprise a predetermined flexion pitch angle at each of said plurality of slits of said side wall portions.

3. A cable protection and guide device according to claim 2, wherein: said outer circumferential wall portions further comprise inserting protrusions; said left side wall portions further comprise inserting holes; and, said inserting protrusions detachably engage said inserting holes.

4. A cable protection and guide device according to claim 2, wherein: said right side wall portions and said left side wall portions each include an opening window; each of said opening windows communicates with said slits in said side wall portions; and, each of said opening windows penetrates into said cable accommodating space.

5. A cable protection and guide device according to claim 2, wherein said synthetic resin is polypropylene.

6. A cable protection and guide device according to claim 1, wherein: said outer circumferential wall portions further comprise inserting protrusions; said left side wall portions further comprise inserting holes; and, said inserting protrusions detachably engage said inserting holes.

7. A cable protection and guide device according to claim 6, wherein: said right side wall portions and said left side wall portions each include an opening window; each of said opening windows communicates with said slits in said side wall portions; and, each of said opening windows penetrates into said cable accommodating space.

8. A cable protection and guide device according to claim 6, wherein said synthetic resin is polypropylene.

9. A cable protection and guide device according to claim 1, wherein: said right side wall portions and said left side wall portions each include an opening window; each of said opening windows communicates with said slits in said side wall portions; and, each of said opening windows penetrates into said cable accommodating space.

10. A cable protection and guide device according to claim 9, wherein said synthetic resin is polypropylene.

11. A cable protection and guide device according to claim 1, wherein said synthetic resin is polypropylene.

* * * * *